(12) United States Patent
Kudou et al.

(10) Patent No.: US 8,208,774 B2
(45) Date of Patent: Jun. 26, 2012

(54) SILICA-BASED SINGLE CORE OPTICAL FIBER, SILICA-BASED MULTI CORE OPTICAL FIBER, AND FABRICATION METHOD FOR THE SAME

(75) Inventors: Manabu Kudou, Yotsukaido (JP);
Kazuyuki Hayashi, Yotsukaido (JP);
Takashi Tsumanuma, Sakura (JP)

(73) Assignee: Fujikura Ltd., Tokyo (JP)

( * ) Notice: Subject to any disclaimer, the term of this patent is extended or adjusted under 35 U.S.C. 154(b) by 73 days.

(21) Appl. No.: 12/333,970

(22) Filed: Dec. 12, 2008

(65) Prior Publication Data

US 2009/0245742 A1 Oct. 1, 2009

(30) Foreign Application Priority Data

Apr. 1, 2008 (JP) ................................ 2008-095211

(51) Int. Cl.
*G02B 6/02* (2006.01)
(52) U.S. Cl. .................... 385/123; 385/126; 385/127
(58) Field of Classification Search .................. None
See application file for complete search history.

(56) References Cited

U.S. PATENT DOCUMENTS

| 3,190,735 | A | 6/1965 | Kapany | |
|---|---|---|---|---|
| RE35,138 | E * | 1/1996 | Weidman | 385/42 |
| 7,045,737 | B2 | 5/2006 | Onishi et al. | |
| 2003/0215201 | A1* | 11/2003 | Tanigawa et al. | 385/123 |
| 2003/0221459 | A1 | 12/2003 | Walczak | |
| 2005/0135762 | A1 | 6/2005 | Ikeda et al. | |
| 2006/0088261 | A1 | 4/2006 | Berkey et al. | |
| 2007/0081779 | A1* | 4/2007 | Flammer | 385/123 |
| 2009/0245742 | A1 | 10/2009 | Kudou et al. | |
| 2011/0036124 | A1 | 2/2011 | Kudou et al. | |

FOREIGN PATENT DOCUMENTS

| CN | 1795404 A | 6/2006 |
|---|---|---|
| CN | 1800892 A | 7/2006 |
| CN | 101044421 A | 9/2007 |
| JP | 08-224240 A | 9/1996 |
| JP | 2005-532883 A | 11/2005 |

OTHER PUBLICATIONS

United States Patent and Trademark Office, "Non-Final Office Action," issued in connection with U.S. Appl. No. 12/909,504, on Jan. 19, 2011.
European Search Report dated Feb. 20, 2012 issued by the European Patent Offtice in counterpart European Application No. 08021390.3.

* cited by examiner

*Primary Examiner* — Uyen Chau N Le
*Assistant Examiner* — Chad Smith
(74) *Attorney, Agent, or Firm* — Sughrue Mion, PLLC (57) ABSTRACT

A silica-based multi core optical fiber and a fabrication method for the same are provided, and include two or more cores of $GeO_2$—$SiO_2$ glass including an fluorine concentration not less than about 15 w % and a germanium concentration about 0.05 wt % to 2 wt %, in a core. A relative refractive index difference of a cladding and a core is not less than about 3%; and a ratio of a cladding diameter to a core diameter is about 1.02 to 3.0. A silica-based single core optical fiber is also provided, and includes a core having a germanium concentration not less than about 15 wt % and an fluorine concentration about 0.05 wt % to 2 wt %.

5 Claims, 8 Drawing Sheets

SILICA-BASED SINGLE CORE OPTICAL FIBER, SILICA-BASED MULTI CORE OPTICAL FIBER, AND FABRICATION METHOD FOR THE SAME

CROSS REFERENCE TO RELATED APPLICATION AND INCORPORATION BY REFERENCE

This application is based upon and claims priority from prior Japanese Patent Application No. P2008-095211 filed on Apr. 1, 2008, the entire contents of which are incorporated herein by reference.

BACKGROUND OF THE INVENTION

1. Field of the Invention

Apparatus and methods consistent with the present invention relate to a silica-based single core optical fiber, a silica-based multi core optical fiber, and a fabrication method for the same, which control an auto fluorescence phenomenon in a visible wavelengths region occurred when transmitting light of the light region (about 400 nm to about 800 nm). In particular, exemplary embodiments of the present invention relate to a silica-based single core optical fiber, a silica-based multi core optical fiber, and a fabrication method for the same, which may be used in confocal fluorescent imaging, fluorescence detection, luminescence detection, a spectroscopy, and the like, by using an optical fiber.

2. Description of the Related Art

Currently, diagnosis and analysis using fluorescence analysis, luminescence detection, and a spectral analysis using light in light regions including fluorescent diagnostics, are conducted, and in particular the wavelength used has become short with the technical progress of semiconductor lasers.

In recent years, in various medical fields such as those related to gastroenterology, pulmonary disease, or cardiovascular disease, endoscopes are employed for direct observation of surfaces of tissues or as auxiliary apparatuses for medicine. Further, fluorescence diagnostics carried out in combination with an endoscope attracts great deal of attention in recent years.

A tissue irradiated and excited by excitation light emits a fluorescent light having a characteristic spectrum. When the tissue has a lesion such as a tumor or a cancer, the tissue emits a particular fluorescent light having a spectrum different from the normal characteristic spectrum. The fluorescence diagnostics is a diagnostic method utilizing such a characteristic to discern a tissue having a lesion from a normal tissue.

As this diagnostic method does not require collection of tissues from a patient's body, patients are released from physical burden. This is one of the many advantages of this method. A fluorescent diagnostics apparatus suitable for this diagnostic method is disclosed in Japanese Publication H08-224240.

Furthermore, the confocal imaging method in particular using multi core optical fiber attracts attention among the fluorescent diagnostics. According to this method, an observation part which has shown fluorescence is observable with clear and high resolution, and tissue which is in a depth (under the surface) of several 10 to several 100 micrometers from the part can be analyzed.

A confocal fluorescent imaging apparatus using multi core optical fiber is disclosed in the published Japanese translation JP 2005-532883 of the International Application PCT/FR2003/2196.

In this confocal fluorescent imaging apparatus, toward one of a plurality of cores of the multi core optical fiber, an excitation light beam is incident from the incidence edge side and excitation light emitted from an emitting end of multi core optical fiber is illuminated to biomedical tissue of an object. The excitation light beam is an excitation light beam which has wavelengths, such as 405 nm, 488 nm, or 635 nm, for example (outputs are about 10 mW to about 30 mW, and beam diameters are about 1 micrometer to about several micrometers).

As a result, from the biomedical tissue, auto fluorescence according to a state of the tissue occurs in a region where a wavelength is longer than a wavelength of the excitation light. This fluorescence is transmitted to an incidence edge through the same core with the excitation light, and after excitation light is separated, predetermined information (spectral intensity and shape) is obtained, a predetermined process is performed and auto fluorescence has is obtained.

Such operation is performed by scanning the whole fiber end with speed of per second 12 frames, and a two-dimensional image is obtained by obtaining a confocal image for every pixel. Since the illumination of excitation light to the biomedical tissue and the transmission of fluorescence are performed by the same core, fluorescence from sources other than a focal plane is removed by effect of spatial filtering, and, as a result, confocal characteristics are achieved.

When the inventors of the present invention experimented with improving the multi core optical fiber used for the above confocal fluorescent imaging methods for the purpose of quality improvement of an image obtained by the confocal fluorescent imaging method, the inventors found out the following problems. The experiment will be explained including procedures.

Figure 1:
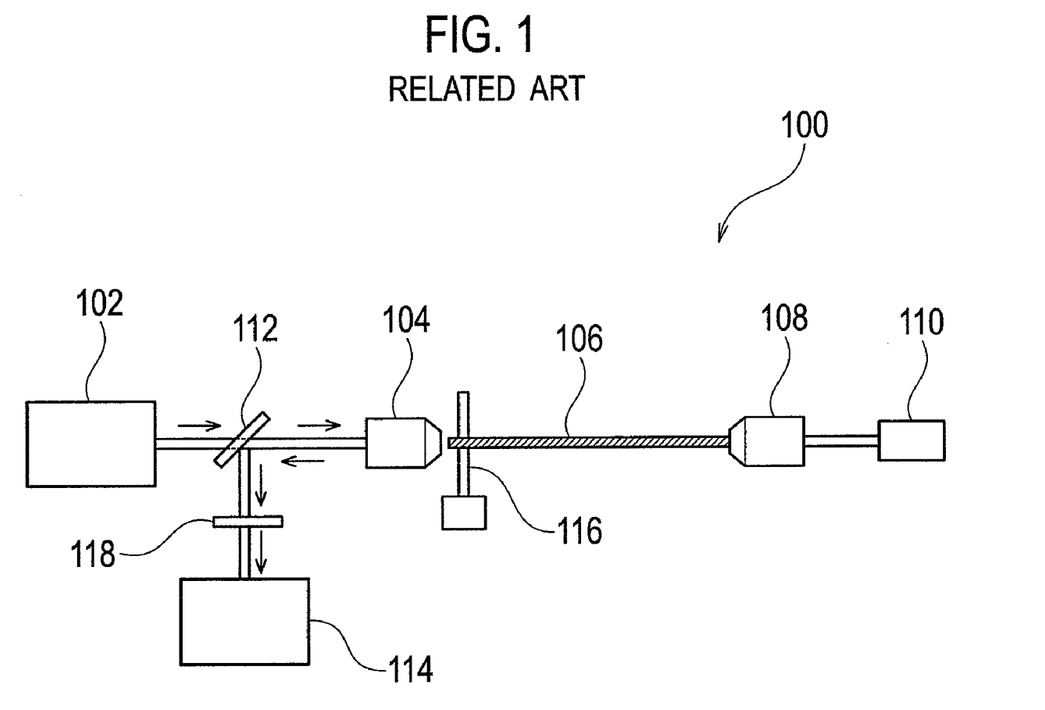
FIG. 1 is a schematic configuration diagram showing a spectrum measurement apparatus applied to auto fluorescence spectrum measurement of a related art multi core optical fiber.

FIG. 1 shows a schematic configuration diagram of the spectrum measurement apparatus 100 applied to auto fluorescence spectrum measurement of a related art multi core optical fiber.

As shown in FIG. 1, the spectrum measurement apparatus 100 applied to auto fluorescence spectrum measurement of a related art multi core optical fiber mainly includes a light source 102 which emits a laser beam with a wavelength of 488 nm as excitation light, an optical lens 104 for condensing the laser beam into a beam from the light source 102 about 2 to 3 micrometers in diameter, a multi core optical fiber 106 in which the beam passed through the optical lens 104 is incident, an objective lens 108 provided in an emitting end of the multi core optical fiber 106, and a CCD 110 optically combined with the objective lens 108.

The spectrum measuring device 100 further includes a dichroic filter 112 allowing laser light from the light source 102 to pass through and reflecting light reflected by the objective lens 108 and passing through the multi-core optical fiber 106 and the optical lens 104 in this order, and a spectrum analyzer 114 to receive the light reflected by the dichroic filter 112 (light reflected by the objective lens 108) and carry out analysis of the light.

The spectrum measurement apparatus 100 further includes an XYZ stage 116 which adjusts a position of the multi core optical fiber so that between the optical lens 104 and the multi core optical fiber 106 may be connected optically, and a reflective filter 118 for noise reduction.

Figure 2:
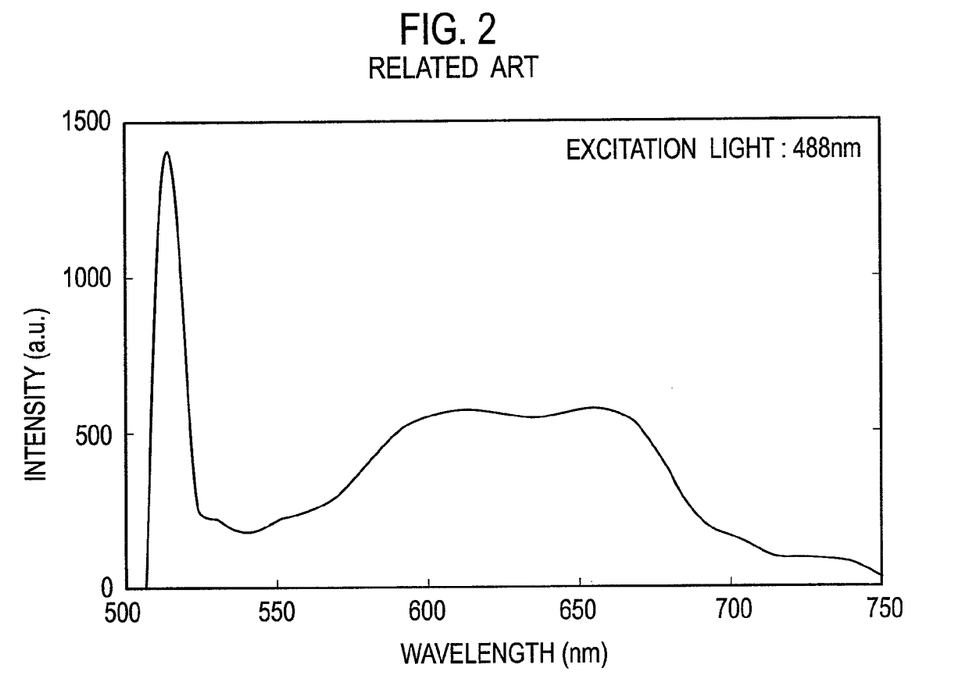
FIG. 2 is a figure showing a spectrum in which an excitation light wavelength of 488 nm is incident on a related art multi-core optical fiber and a returned light is measured.

FIG. 2 shows a spectrum, in which an exemplary embodiment has a relatively sharp induced Raman scattering light wavelength around 515 nm and a broad auto fluorescence peak in the wavelength range of about 520 nm to 750 nm produced by the light source 102 emitting 488 nm laser light (single mode, for example, 22 mW), collecting the light by the optical lens 104 to have the light incident into one of cores of the multi-core optical fiber 106, and carrying out analysis of the light reflected by the objective lens 108 and returned back.

Figure 3:
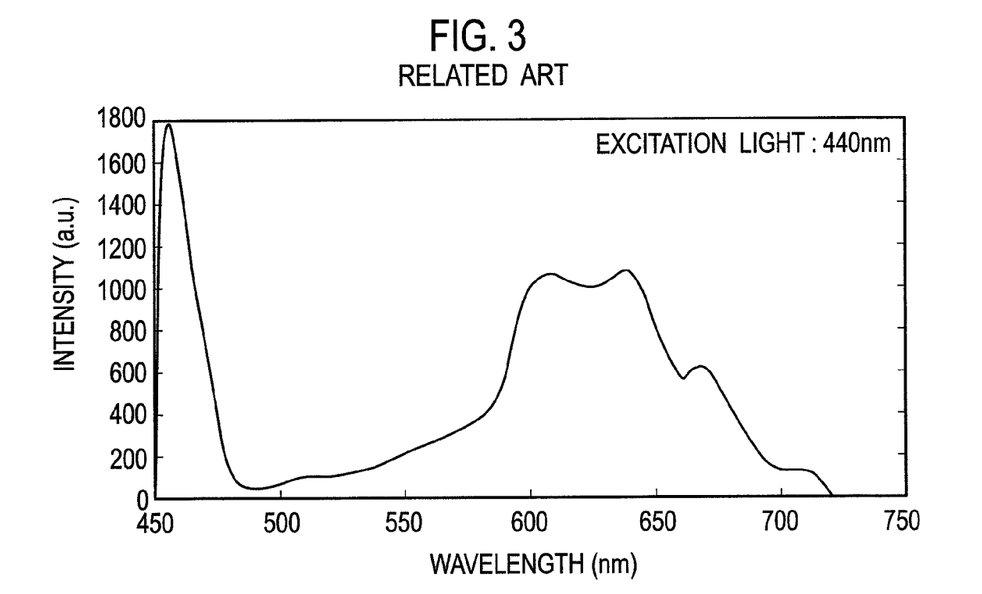
FIG. 3 is a figure showing a spectrum in which an excitation light wavelength of 440 nm is incident on a related art multi-core optical fiber and a returned light is measured.

Moreover, in an exemplary embodiment where the wavelength of the excitation light is 440 nm, as shown in FIG. 3, induced Raman scattering light centering on near the wavelength of 460 nm and a broad auto fluorescence in a range of wavelengths of about 500 nm to about 720 nm is found.

Also in an exemplary embodiment where the wavelength of the excitation light is 635 nm, a longer wavelength range has been observed that includes an auto fluorescence ranging from the excitation light wavelength to about 200 nm longer than the excitation light wavelength.

Thus, wavelengths of fluorescence from tissue being imaged are observed which are in a range of as auto fluorescence from the fiber. This causes poor accuracy of fluorescent diagnostics and reduces a signal-to noise (S/N) ratio.

It is guessed that same luminous phenomenon may become a problem not only for a fluorescent imaging method using the above multi core optical fiber but also in fluorescence detection, luminescence detection, and spectroscopy using a single core fiber.

SUMMARY OF THE INVENTION

An exemplary object of the present invention is to provide a silica-based multi core optical fiber and a fabrication method for the same which can improve accuracy of fluorescent diagnostics by high-resolution and a high S/N ratio.

Another exemplary object of the present invention is to provide a silica-based single core optical fiber and a fabrication method for the same which can improve a S/N ratio and improve detecting accuracy and analysis accuracy, in fluorescence detection, luminescence detection, a spectral analysis, etc. from tissue to observe.

Exemplary aspects and embodiments of the present invention are not required to achieve the objects described above.

According to an aspect of the invention, a silica-based single core optical fiber, comprises a core comprising: a Ge concentration which is not less than about 15 wt % and an fluorine concentration which is about 0.05 wt % to 2 wt %; wherein auto fluorescence of the optical fiber in a wavelength of about 600 nm to 800 nm when an excitation light having a wavelength of about 400 nm to 650 nm is incident into the optical fiber is controlled.

According to the above-mentioned configuration, a silica-based single core optical fiber with a high S/N ratio can be obtained.

According to another aspect of the invention, a silica-based multi core optical fiber, comprises two or more cores, each core comprising $GeO_2$—$SiO_2$ glass a germanium concentration which is not less than about 15 wt % and an fluorine concentration which is about 0.05 wt % to 2 wt %, wherein an auto fluorescence of the optical fiber at a wavelength of about 600 nm to 800 nm is controlled when an excitation light at a wavelength of about 400 nm to 650 nm is incident into the optical fiber.

According to the above-mentioned configuration, a silica-based multi core optical fiber with a high S/N ratio can be obtained.

According to another aspect of the invention, a silica-based multi core optical fiber, comprises two or more cores, each core comprising $GeO_2$—$SiO_2$ glass including, a germanium concentration which is not less than about 15 wt %, and an fluorine concentration which is about 0.05 wt % to 2 wt %, and, a silica-based cladding layer comprising chlorine, wherein a relative index difference of the cladding layer and two or more cores is not less than about 3%, and a ratio of an outer diameter of the cladding layer to a diameter of each core is about 1.02 to 3.0, and wherein an auto fluorescence of the optical fiber at a wavelength of about 600 nm to 800 nm is controlled when an excitation light at a wavelength of about 400 nm to 650 nm is incident into the optical fiber.

According to the above-mentioned configuration, a silica-based multi core optical fiber which is high-resolution and a high S/N ratio can be obtained.

According to another aspect of the invention, a method of fabricating a silica-based single core optical fiber, the method comprising: producing a silica core preform soot, doped by germanium and chlorine, by using $SiCl_4$ and $GeCl_4$ as starting materials; heating and transparent-vitrifying the preform soot in a He gas atmosphere in a sintering furnace with at least one selected from the group consisting of a $SiF_4$ gas, a $SF_6$ gas, and an fluorine series gas, thereby producing a glass rod doped with F to a specified quantity; forming a silica cladding layer on an outer periphery of the glass rod with an outside vapor phase deposition method, thereby forming an optical fiber preform; and drawing the optical fiber preform, thereby forming an optical fiber having a predetermined fiber diameter and a predetermined core diameter, wherein in the core, a Ge concentration is not less than about 15 wt %, an fluorine concentration is not less than about 0.05 wt % and not more than about 2 wt %, and a chlorine concentration is about 0.1 wt % to 0.3 wt %, and a luminescence of the optical fiber at a wavelength of about 600 nm to 800 nm is controlled when excitation light having a wavelength of about 400 nm to 650 nm is incident into the optical fiber.

According to another aspect of the invention, a method of fabricating a silica-based single core optical fiber, the method comprising: producing a silica core preform soot, doped by germanium and chlorine, using $SiCl_4$ and $GeCl_4$ as starting material; heating and transparent-vitrifying the preform soot in a He gas atmosphere in a sintering furnace with at least one selected from the group consisting of a $SiF_4$ gas, a $SF_6$ gas, and an fluorine series gas, thereby producing a glass rod doped with F to a specified quantity; forming a cladding layer comprising fluoridation glass on an outer periphery of the glass rod, with an outside vapor phase deposition method, thereby producing an optical fiber preform; drawing the optical fiber preform, thereby creating a bare optical fiber having a predetermined outer diameter; cutting the bare optical fiber by predetermined length, thereby producing a plurality of bare optical fibers of a prescribed number; and inserting the plurality of bare optical fibers in a silica tube and drawing the silica tube and inserted bare optical fibers, thereby producing a silica-based multi core optical fiber having a predetermined outer diameter, wherein in cores of the multi-core optical fiber, a Ge concentration is not less than about 15 wt %, an fluorine concentration is not less than about 0.05 wt % and not more than about 2 wt %, and a chlorine concentration is about 0.1 wt % to 0.3 wt %, and a luminescence of the multi-core optical fiber at a wavelength of about 600 nm to 800 nm is controlled when excitation light having a wavelength of about 400 nm to 650 nm is incident into the multi-core optical fiber.

According to the silica-based multi core optical fiber and the fabrication method for the same according to exemplary embodiments of the present invention, accuracy of fluorescent diagnostics can be improved by high-resolution and a high S/N ratio.

According to the silica-based single core optical fiber and a fabrication method for the same according to exemplary embodiments of the present invention, an S/N ratio can be improved and detecting accuracy and analysis accuracy can be improved, in fluorescence detection from tissue to be observed, luminescence detection, a spectral analysis, etc.

DETAILED DESCRIPTION OF THE EMBODIMENTS

There will be described exemplary embodiments of the present invention, with reference to the drawings, where like members or elements are designated by like reference characters to eliminate redundancy, and some layers and their subsidiary regions are designated by the same reference characters for simplicity. Drawings are schematic, not actual, and may be inconsistent in between in scale, ratio, etc.

The embodiments to be described are embodiments of a technical concept or spirit of the present invention that is not limited to embodied specifics, and may be changed without departing from the spirit or scope of claims.

Meanwhile, illustrations of a multi-core optical fiber in these drawings are no more than schematic drawings and therefore the elements shown in the drawings are not necessarily drawn to scale. Shapes, dimensions, proportions and arrangement of elements in practical products may be allowed to differ from those in the illustrations. For example, any structure drawn in a circular shape may be modified into an elliptical shape and any structure drawn in a honeycomb-like arrangement may be modified into an orthogonal array.

(Basic Configuration of Silica-Based Single/Multi Core Optical Fiber)

Figure 5:
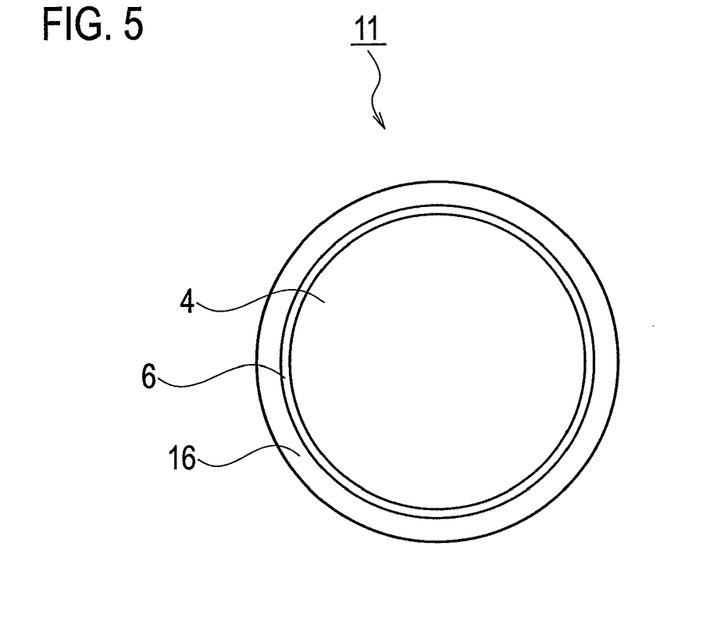
FIG. 5 is a schematic cross-sectional configuration chart of a silica-based single core optical fiber according to an embodiment of the present invention.

FIG. 5 shows a schematic cross-sectional structure of a silica-based single core optical fiber according to an embodiment of the present invention.

As shown in FIG. 5, the silica-based single core optical fiber 11 according to an embodiment of the present invention includes a silica-based core 4 for image transmissions, a silica cladding layer 6 for enclosing an outer periphery of the silica-based core 4, and a covering layer 16 further enclosing an outer periphery of the silica cladding layer 6.

The silica-based core 4 includes a germanium having a concentration which is not less than about 15 wt % and an fluorine concentration which is about 0.05 wt % to 2 wt %. An auto fluorescence of the optical fiber 11 in a wavelength of about 600 nm to 800 nm when an excitation light having a wavelength of about 400 nm to 650 nm is incident into the optical fiber is controlled.

The silica-based core 4 further includes chlorine. The chlorine concentration in the core is about 0.1 wt % to 0.3 wt %.

The diameter of the core is about 2 micrometers to 390 micrometers.

Figure 6:
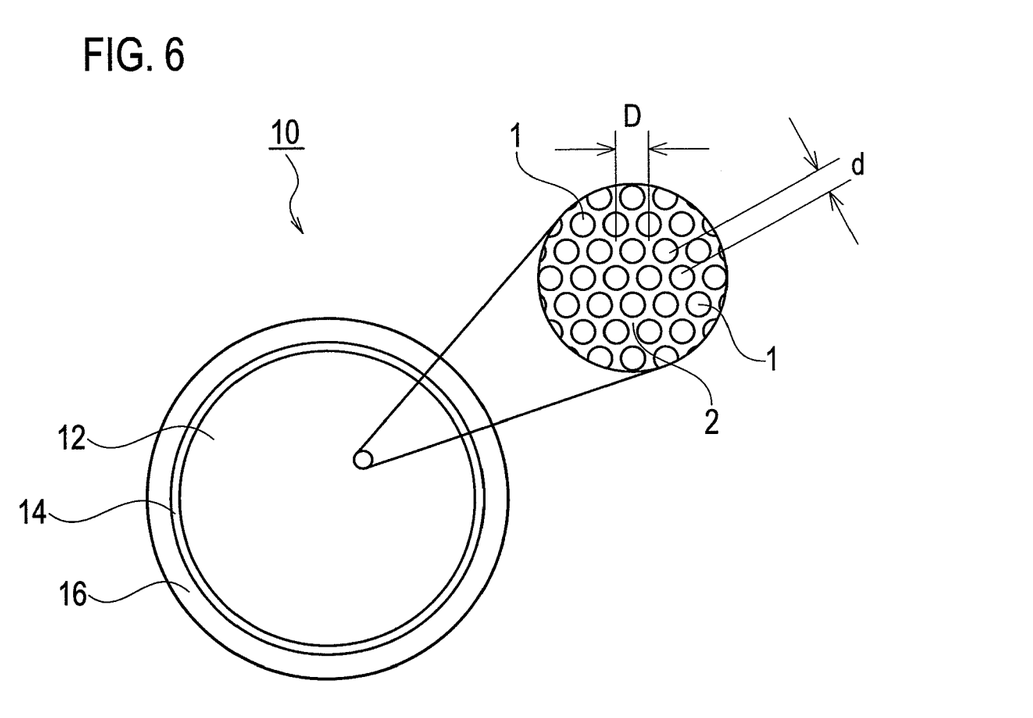
FIG. 6 is a schematic cross-sectional configuration chart of a silica-based multi core optical fiber according to an embodiment of the present invention.

FIG. 6 shows schematic section structure of a silica-based multi core optical fiber according to an embodiment of the present invention.

As shown in FIG. 6, the silica-based multi core optical fiber 10 according to an embodiment of the present invention includes an image circle region 12 for image transmissions, a silica-glass jacket 14 for enclosing an outer periphery of the image circle region 12, and a covering layer 16 further enclosing an outer periphery of the silica-glass jacket 14.

The image circle region 12 comprises a plurality of cores 1 which allows transmission of light and functions as a pixel of the silica-based multi core optical fiber 10, and a common cladding layer 2 which the core 1 of these plurality passes through, as enlarged and shown in FIG. 6.

The common cladding layer 2 is shared by a plurality of the cores 1. A diameter of the image circle region 12 is for example about 600 micrometers, for example, and the number of cores 1 embedded therein ranges from ten thousand to thirty thousand. Thereby an image focused on one end of the silica-based multi core optical fiber 10 is spatially divided into the number of cores 1 and the divided images are respectively transmitted through the cores 1 so that the image is reproduced on another end of the silica-based multi core optical fiber 10.

Figure 7:
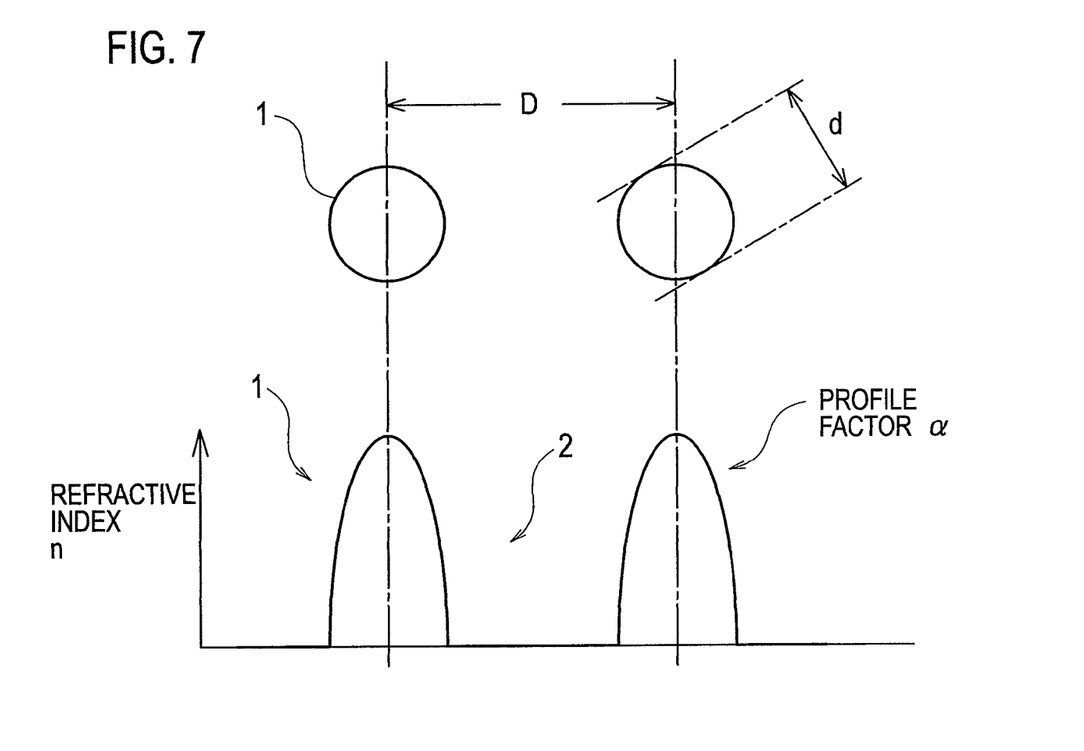
FIG. 7 is a drawing showing a refractive index profile of a core and common cladding layer of the silica-based multi core optical fiber according to an embodiment of the present invention.

FIG. 7 shows a refractive index profile of the core 1 and the common cladding layer 2 of the silica-based multi core optical fiber 10 according to an embodiment of the present invention.

The cores 1 include silica doped, for example, with germanium oxide ($GeO_2$) which increases the refractive index. The doping agent increases in concentration toward centers of the cores 1 and therefore the refractive index profile is convex upward and has peaks at the centers (central axis) of the cores 1, as shown in FIG. 7. The profile has refractive index profile factor $\alpha$ from about 2.0 to 3.0 for example.

Moreover, the diameters d of the cores 1 are about 1.0 micrometer to about 10 micrometers, for example, and the intervals (core interval) D of a center between the two adjacent cores 1 are about 3.0 micrometers to about 15 micrometers, for example. Further, the silica-based multi core optical fiber 10 has NA (Numerical Aperture) from about 0.30 to about 0.45, for example.

The refractive index profile factor α is a factor satisfying the following equation of:

$$n(r)=n_1[1-2\Delta(r/a)^\alpha]^{1/2} \ (0<=r<=a),$$

where n(r) represents a refractive index at a remove of distance r from the center of the core 1, $n_1$ represents refractive index at the center of the core 1, Δ represents a relative index difference in a central axis of the core 1 over the common cladding layer 2, and a represents radius of the core 1. The common cladding layer 2 includes silica which is pure silica or doped with fluorine (F) which decreases the refractive index, for example. The refractive index in the cladding layer 2 keeps substantially constant.

(Fabrication Method)

The silica-based multi core optical fiber 10 is produced in accordance with the following process.

(a) First, the process includes forming a silica core preform soot by a VAD (Vapor-phase Axial Deposition) method, which is doped, for example, with germanium (Ge) to have the refractive index profile factor a within the aforementioned range.

(b) Next, the process includes heating the preform soot in a sintering furnace so as to have the preform soot transparent-vitrified, thereby a glass rod for cores is obtained.

(c) Subsequently, the process includes forming a silica glass layer, a fluorine-doped glass layer, or a boron addition glass layer on an outer periphery of the glass rod by a plasma outside vapor deposition method or an outside vapor deposition (OVD) method, which is to be the common cladding layer 2 of the silica-based multi core optical fiber 10, thereby producing an optical fiber preform. In addition, a fluorine-doped tube or a boron-doped tube may be formed by a PCVD (Plasma Chemical Vapor Deposition) method or a MCVD (Modified Chemical Vapor Deposition) method, thereby providing the silica-glass jacket 14.

(d) Next, the process includes drawing the optical fiber preform to a bare optical fiber of several hundred micrometers in diameter.

(e) Afterward, the process further includes cutting this bare optical fiber at intervals of predetermined length into about 1000 to about 30,000 bare optical fibers.

(f) Next, these bare optical fibers are inserted into a silica tube and drawn together, thereby a silica-based multi core optical fiber of about 150 micrometers to about 2500 micrometers in diameter is produced.

(g) Finally, the process includes forming a coating layer 16 of about 20 micrometers to about 100 micrometers in thickness on the outermost layer. Thereby, a final product of a silica-based multi core optical fiber is obtained.

(Result of Measurement of Auto Fluorescence Peak in Visible Light Region)

Figure 8:
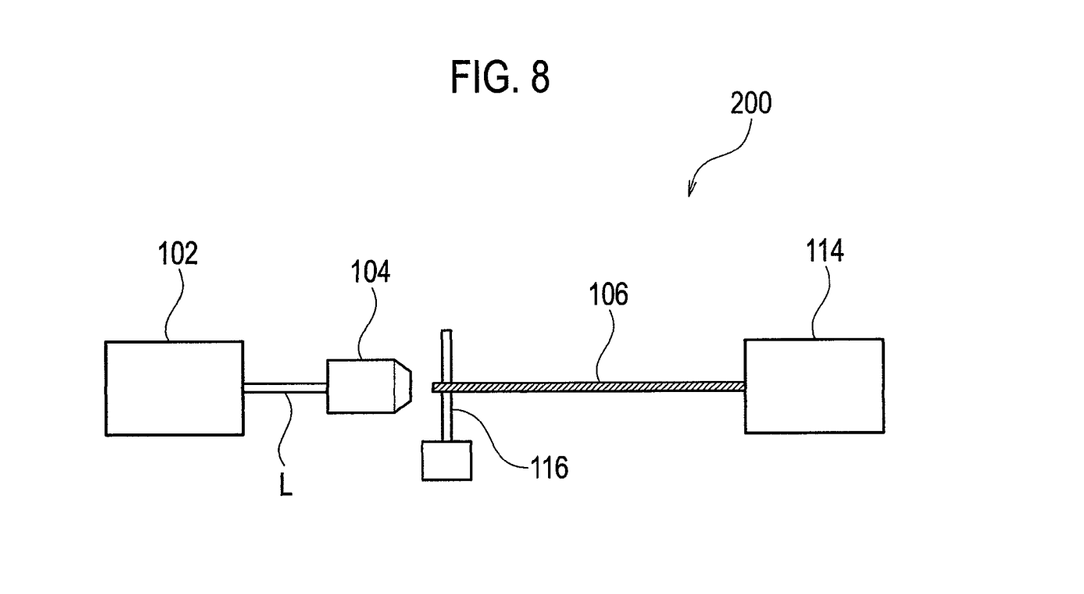
FIG. 8 is a schematic configuration diagram of a spectrum measurement apparatus applied to auto fluorescence spectrum measurement of silica-based multi core optical fiber, according to an embodiment of the present invention.

Some experiments carried out by the inventors for the purpose of studying the origins of the auto fluorescence peak in a light region mentioned above will be described hereinafter. FIG. 8 shows a schematic configuration diagram of a spectrum measurement apparatus 200 applied to auto fluorescence spectrum measurement of the silica-based multi core optical fiber according to the embodiment of the present invention.

As shown in FIG. 8, the spectrum measurement apparatus 200 applied to the auto fluorescence spectrum measurement of the silica-based multi core optical fiber according to an embodiment of the present invention is different from the emission spectrum measurement apparatus 100 at least in respect of the following.

That is, in the emission spectrum measurement apparatus 200, the objective lens 108, the CCD 110, and the dichroic filter 112 are not used, but a spectrum analyzer 114 is directly connected to an emitting end of the silica-based multi core optical fiber 106 and/or a silica-based single core fiber optically. Moreover, a semiconductor laser of a single mode is used as the light source 102, for example. As for a semiconductor laser, a wavelength is 408 nm and an output is about 20 mW, for example.

(Basic Configuration of Silica-Based Single Core Optical Fiber)

In order to investigate a cause, which a auto fluorescence peak in a visible light region mentioned above generates, the inventors experimented by first of all using a silica-based single core optical fiber with a large core diameter. More specifically, a silica-based single core optical fibers having a Ge concentration of 0 wt %, 4 wt %, 10 wt %, 15 wt %, and 26 wt % and including a small amount of chlorine to the core 1 is created, and arelation (emission spectrum) between a light emitting power and a wavelength was measured. In addition, diameter of the core 1 of the silica-based single core optical fibers is about 2 micrometers to several hundreds of micrometers, for example.

At this point, a reason which includes chlorine in very small amount at the core 1 is because starting raw materials at the time of forming the fibers are $SiCl_4$ and $GeCl_4$. In the Japanese patent No. 2699231 entitled "RADIATION-PROOF OPTICAL FIBER, IMAGE FIBERS, AND THOSE FABRICATION METHODS", to use alkoxy germanium (Ge $(CH_3O)_4$, $Ge(C_2H_5O)_4$, etc.) as starting raw materials is disclosed in order to improve radiation-proof characteristics. However, the above-mentioned raw materials are expensive. Therefore, it is preferable to use $SiCl_4$ and $GeCl_4$ as the starting raw materials at the time of forming the fiber in respect of lowness of cost and an ease of handling rather.

Figure 10:
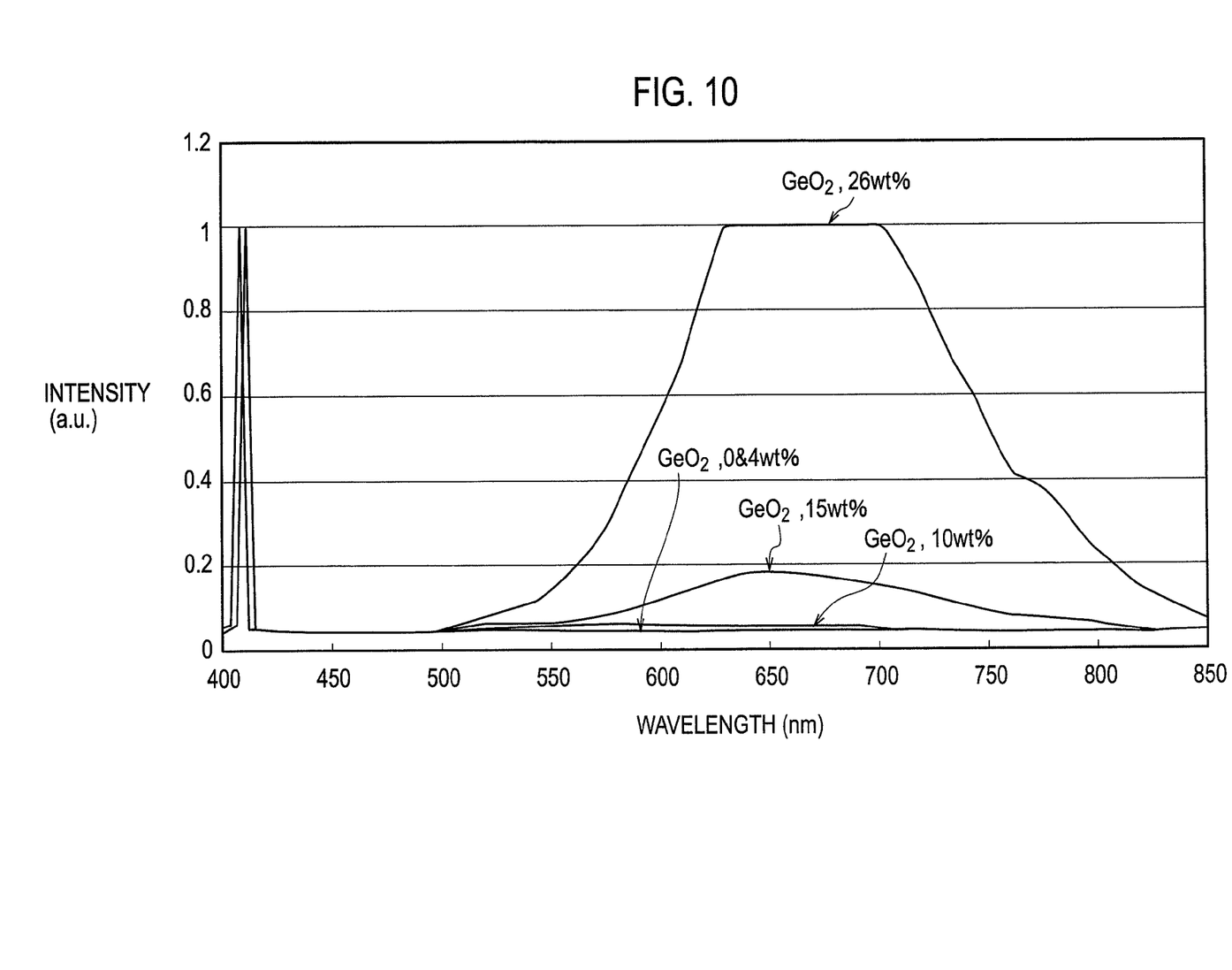
FIG. 10 is a drawing showing a relation of auto fluorescence intensity and a wavelength measured using the spectrum measurement apparatus of an embodiment, about a silica-based single core optical fiber with a Ge concentration 0 wt % 4 wt % 10 wt % 15 wt % and 26 wt %.

FIG. 10 shows a result of a measurement of an auto fluorescence spectrum measured about the silica-based single core optical fiber having a Ge concentration of 0 wt %, 4 wt %, 10 wt %, 15 wt %, and 26 wt % by using the spectrum measurement apparatus 200 (FIG. 8).

As shown in FIG. 10, in the emission spectrum of the silica-based single core optical fiber with Ge content which is not less than 15 wt %, broad auto fluorescence which is the maximum near a wavelength of 650 nm and reaches to a range which exceeds a wavelength of about 800 nm from near a wavelength of about 500 nm is observed.

When its attention is paid to intensity of this auto fluorescence, it proves that the intensity of luminescence increases, so that there is much Ge concentration of the core. Moreover, in a silica-based single core optical fiber having a Ge concentration of 0 wt %, 4 wt %, and 10 wt %, this auto fluorescence has disappeared mostly.

It is clear from the above result that such the broad auto fluorescence is an auto fluorescence which Ge kind doped in the core 1 is excited and is emitted by excitation light.

The inventors are also verifying the following facts experimentally. Auto fluorescence spectrum intensity may be increased so that a Ge concentration in the core 1 becomes large, but if a Ge concentration exceeds about 15 wt %, the auto fluorescence intensity becomes so large becoming different to ignore, and a value of the light emitting power decreases with a time period.

Figure 4:
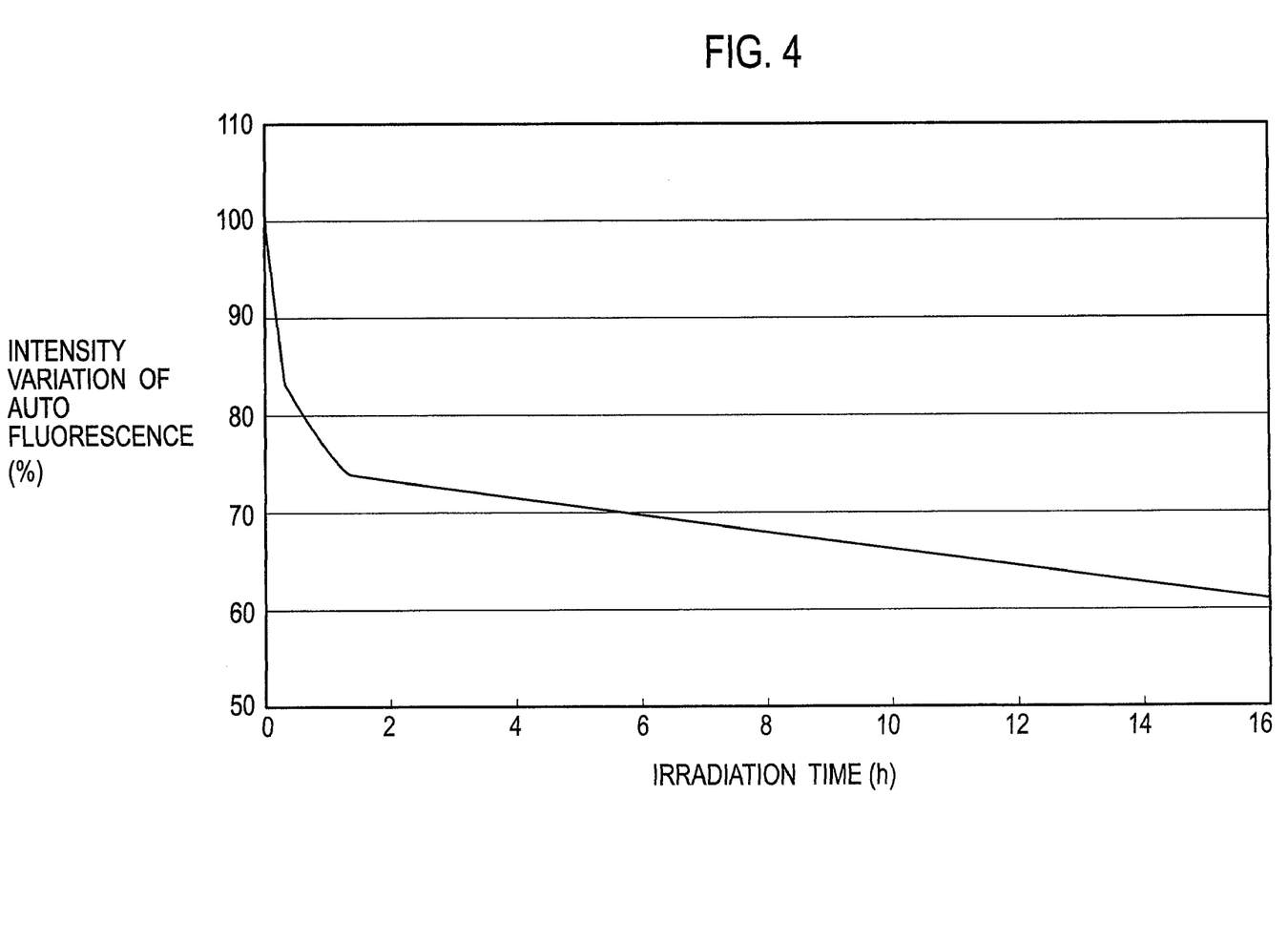
FIG. 4 is a figure showing a relation between decreasing rate of light emitting power (%) and irradiation time (h) at the time when excitation light with a wavelength of 408 nm is incident, and is a figure showing a variation per hour of auto fluorescence of emitted light with a wavelength of 650 nm.

FIG. 4 shows a relation between the decreasing rate of light emitting power (%) and the irradiation time (h), at the time when the excitation light with a wavelength of 408 nm is incident. In FIG. 4, a variation per hour of peak of emitted light in a wavelength of 650 nm is shown.

As shown in FIG. 4, it is observed that 20% of light emission peak reduction by only about 10 minutes of elapsed irradiation time, and about 20% to 30% of 1 auto fluorescence peak reduction by one hour of elapsed irradiation time. This is a certain kind of photograph darkening phenomenon.

When this variation per hour occurs, for example, distinction of whether it is based on attenuation of a fluorescence signal from a biomedical tissue or based on attenuation depending on a fiber becomes impossible to determine, thereby an S/N ratio is worsened. The inventors found out that these auto fluorescence phenomena could be controlled by doping a small amount of fluoride (F) with Ge to the core 1, as a result of studying a measure against control of these luminous phenomena.

Hereinafter, embodiments will be described specifically.

EXEMPLARY EXAMPLE 1

(a) First of all, the process includes producing silica core preform soot by which germanium and a small amount of chlorine are doped, by using $SiCl_4$ and $GeCl_4$ as a starting material by a VAD method.
(b) Next, the process includes heating and transparent-vitrifying this preform soot in He gas atmosphere with $SiF_4$ gas, $SF_6$ gas, or fluorine series gas in a sintering furnace, thereby obtaining a glass rod which doped F to the specified quantity core 1.
(c) Next, the process includes forming silica cladding layer on an outer periphery of this glass rod with an outside vapor phase deposition method, thereby obtaining an optical fiber preform.
(d) Next, the process includes drawing this optical fiber preform, thereby obtaining optical fiber with a fiber diameter of 430 micrometers and a core diameter of 390 micrometers.

According to an ultimate analysis result of this optical fiber, a maximum of a Ge concentration which is about 30 wt %, an fluorine concentration which is about 0.1 wt %, and a chlorine concentration which is about 0.1 to 0.3 wt % are included in the core 1. When light emitting power of this fiber is incident into the core 1 with a fiber length about 2 m using a semiconductor laser of a wavelength of 408 nm and outputs of about 20 mW, and this emission spectrum is measured using the emission spectrum measurement apparatus 200 shown in FIG. 8, an auto fluorescence in a wavelength of about 500 nm to about 850 nm is not observed at all, as shown in FIG. 11.

Figure 11:
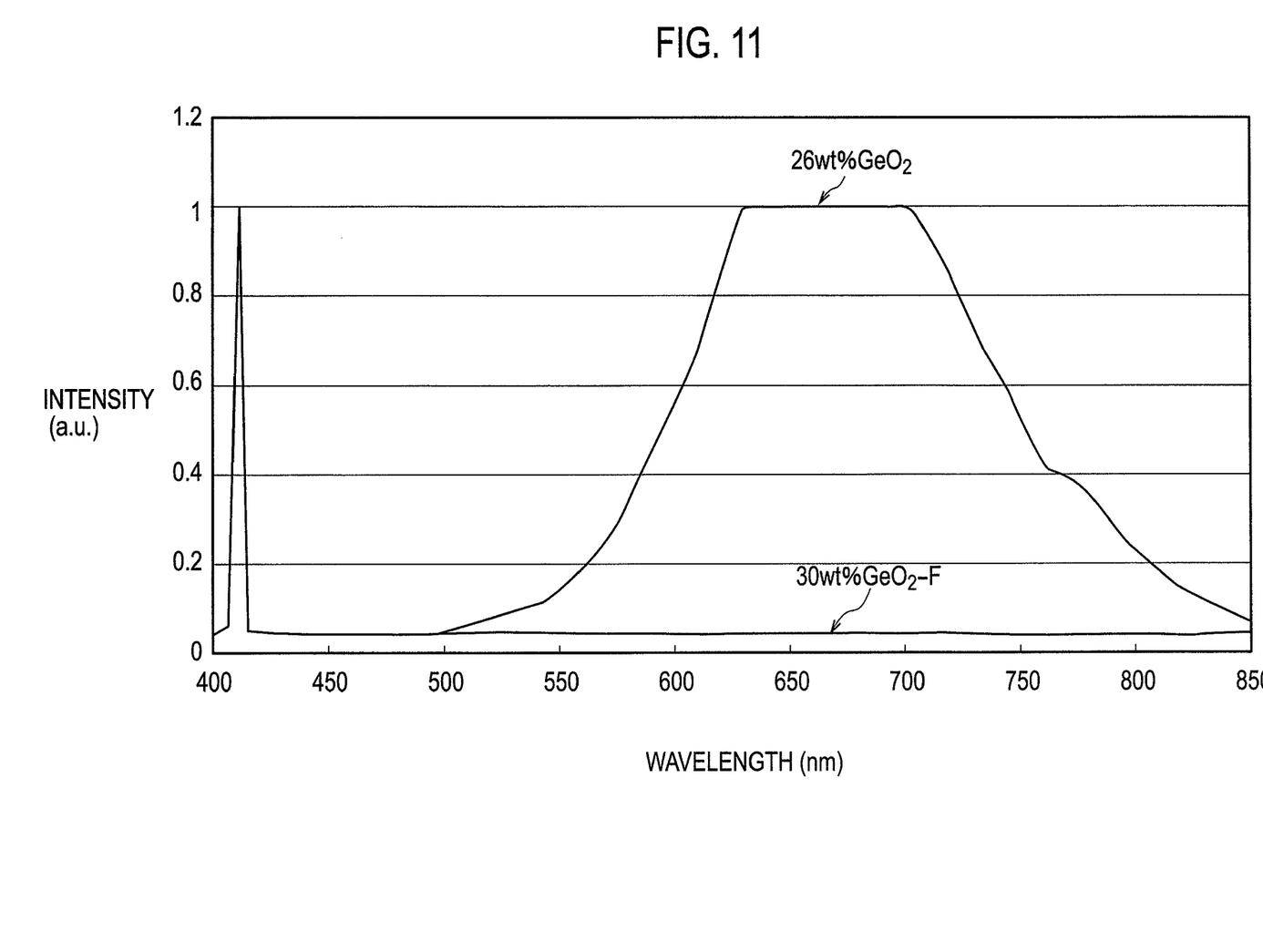
FIG. 11 is a comparison characteristics chart of light emitting power of a Ge concentration 26 wt % ($GeO_2$) core and a 30 wt % ($GeO_2$—F) core, in the silica-based single core optical fiber according to an embodiment of the present invention.

In FIG. 11, the light emission peak observed on 410 nm to 420 nm is stimulated Raman scattering light.

COMPARATIVE EXAMPLE 1

(a) First of all, the process includes producing silica core preform soot by which germanium and a small amount of chlorine are doped, by using $SiCl_4$ and $GeCl_4$ as a starting material by a VAD method.
(b) Next, the process includes heating and transparent-vitrifying this preform soot in He gas atmosphere in a sintering furnace, thereby obtaining a glass rod. At this point, F gas is not introduced.
(c) Next, the process includes forming silica cladding layer in the outer periphery with an outside vapor phase deposition method after extending this glass rod in a predetermined diameter, thereby obtaining an optical fiber preform.
(d) Next, the process includes drawing this optical fiber preform, thereby obtaining optical fiber with a fiber diameter of 430 micrometers and a core diameter of 390 micrometers.

According to an ultimate analysis result of this optical fiber, a maximum of a Ge concentration which is about 26 wt %, and a chlorine concentration which is about 0.3 wt % are included in the central part of the core 1. When light emitting power of this fiber is incident into the core 1 of a fiber length about 2 m using a semiconductor laser of a wavelength of 408 nm and outputs of about 20 mW, and this auto fluorescence spectrum is measured using the auto fluorescence spectrum measurement apparatus 200 shown in FIG. 8, very great auto fluorescence of a wavelength of about 500 nm to about 850 nm is observed, as shown in FIG. 11. Moreover, the light emitting power is saturated with about 600 nm to about 700 nm.

EXEMPLARY EXAMPLE 2

(a) First of all, the process includes producing silica core preform soot by which germanium and a small amount of chlorine are doped, by using $SiCl_4$ and $GeCl_4$ as a starting material by the known VAD method.
(b) Next, the process includes heating and transparent-vitrifying this preform soot with $SiF_4$ gas, $SF_6$ gas, or fluorine series gas in a sintering furnace, thereby obtaining a glass rod which doped F to the specified quantity core 1.
(c) Next, the process includes forming fluoridation glass to be the common cladding layer 2 of the silica-based multi core optical fiber on an outer periphery of this glass rod with an outside vapor phase deposition method, thereby obtaining an optical fiber preform.
(d) Next, the process includes drawing this optical fiber preform, thereby obtaining an optical fiber with an outer diameter of about 150 micrometers.
(e) Afterward, the process includes cutting this bare optical fiber by predetermined length, thereby obtaining about 10,000 bare optical fibers.
(f) Next, the process includes inserting these bare optical fibers in a predetermined silica tube and drawing this, thereby producing the silica-based multi core optical fiber 10 with an outer diameter of about 500 micrometers.

Figure 9:
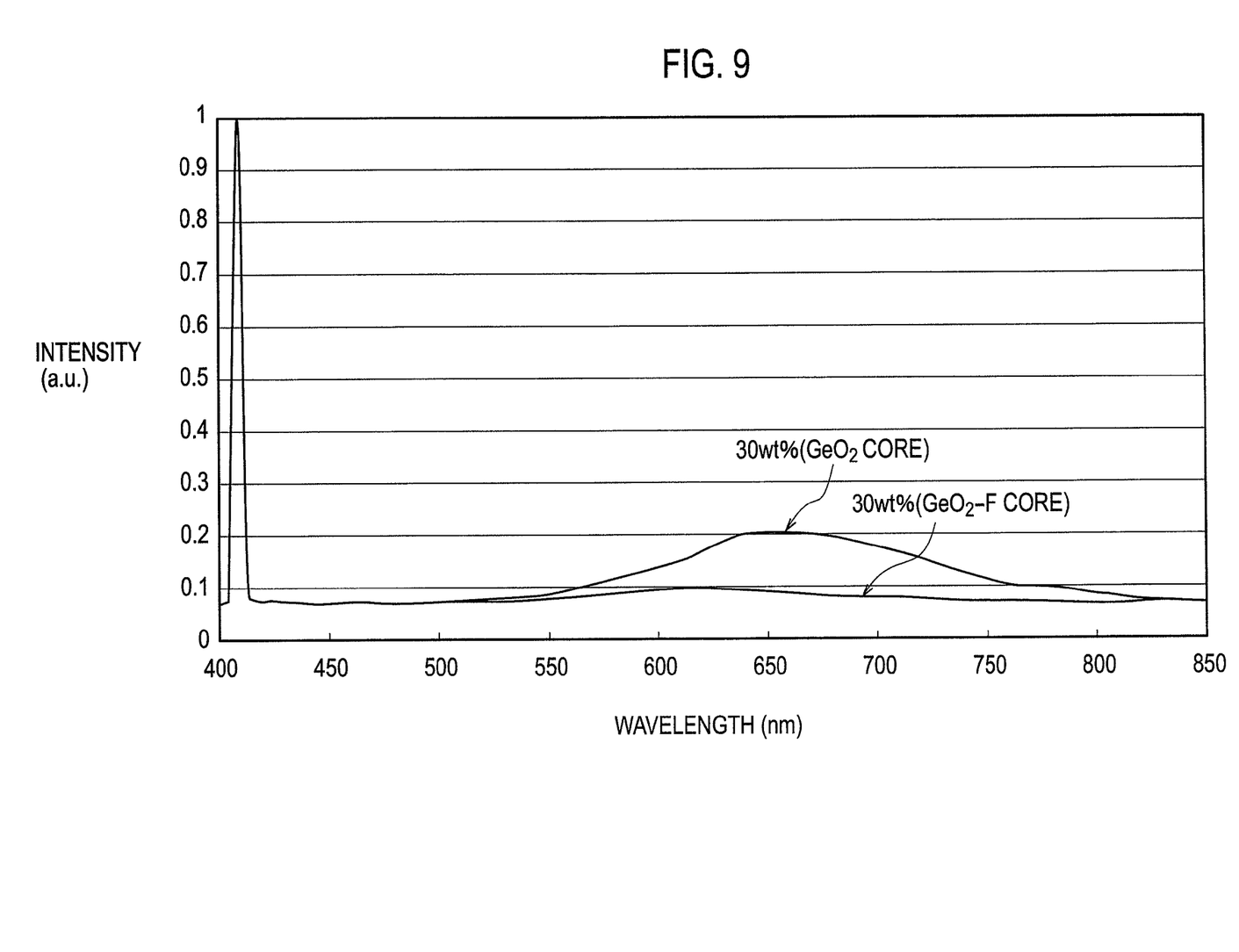
FIG. 9 is a comparison characteristics chart of light emitting power of a Ge concentration 30 wt % ($GeO_2$) core and a 30 wt % ($GeO_2$—F) core, in silica-based multi core optical fiber according to an embodiment of the present invention.

According to an ultimate analysis result of this silica-based multi core optical fiber 10, a maximum of a Ge concentration which is about 30 wt %, an fluorine concentration which is about 0.05 wt %, and a chlorine concentration which is about 0.1 to 0.3 wt % are included in the central part of each the core 1. When light emitting power of this fiber is extracted and incident into some cores 1 (the diameter d: about 10 micrometers) of about 2 m of fiber length of the silica-based multi core optical fiber 10 with a fiber length about 2 m using a semiconductor laser of a wavelength of 408 nm and about 20 mW of outputs, and this auto fluorescence spectrum is measured using the auto fluorescence spectrum measurement apparatus 200 shown in FIG. 8, an auto fluorescence in a wavelength of about 500 nm to about 850 nm is not observed at all, as shown in FIG. 9. Moreover, as shown in FIG. 9, a light emission peak by stimulated Raman scattering light observed by wavelength of about 410 nm to about 420 nm is observed.

COMPARATIVE EXAMPLE 2

(a) First of all, the process includes producing silica core preform soot by which germanium and a small amount of chlorine are doped, by using $SiCl_4$ and $GeCl_4$ as a starting material by a VAD method.

(b) Next, the process includes heating and transparent-vitrifying this preform soot in a sintering furnace, thereby obtaining a glass rod. At this point, F gas is not introduced.
(c) Next, the process includes forming silica cladding layer in the outer periphery with an outside vapor phase deposition method after extending this glass rod in a predetermined diameter, thereby obtaining an optical fiber preform.
(d) Next, the process includes drawing this optical fiber preform, thereby obtaining optical fiber with an outer diameter of about 150 micrometers.
(e) Afterward, the process includes cutting this bare optical fiber by predetermined length, thereby obtaining about 30,000 bare optical fibers.
(f) Next, the process includes inserting these bare optical fibers in a predetermined silica tube and drawing this, thereby producing the silica-based multi core optical fiber with an outer diameter of about 650 micrometers.

According to an ultimate analysis result of this silica-based multi core optical fiber, a maximum of a Ge concentration which is about 30 wt %, a chlorine concentration which is about 0.2 wt %. When auto fluorescence intensity of this fiber is extracted and incident into some cores 1 (the diameter d: about 10 micrometers) of about 2 m of fiber length of the silica-based multi core optical fiber 10 using a semiconductor laser of a wavelength of 408 nm and outputs of about 20 mW, and this e auto fluorescence spectrum is measured using the spectrum measurement apparatus 200 shown in FIG. 8, a clear auto fluorescence in a wavelength of about 550 nm to about 800 nm (auto fluorescence peak is about 650 nm) is observed, as shown in FIG. 9. Moreover, as shown in FIG. 9, stimulated Raman scattering light observed by wavelength of about 410 nm to about 420 nm is observed.

Next, other characteristics of silica-based multi core optical fiber, i.e., resolution and contrast will be explained. One of the parameters which influence the resolution is the core interval D. Although physical resolution will become large if an interval of adjoining cores becomes narrow, but if this interval becomes narrow too much, a cross talk will occur. If the cross talk becomes large, a blot of light will occur, thereby a problem that contrast reduces or an image which is in sight is colored will occur. In the silica-based multi core optical fiber used for a confocal fluorescent imaging method, however, coloring does not pose much of a problem. However, it is necessary to design the silica-based multi core optical fiber, achieve resolution and contrast moderate on balance with sufficient balance with a refractive index profile.

According to examination by the inventors, a silica-based multi core optical fiber which has the following configurations may be used for the confocal imaging method.

As mentioned above, a material configuration is composed of a small amount of chlorine which is included in the core 1, and is composed of included an fluorine concentration which is about 0.05 wt % to about 3 wt % (preferable about 0.1 wt % to about 2 wt %), a Ge concentration which is more than or equal to about 15 wt %, and $GeO_2$—$SiO_2$—F glass, thereby the auto fluorescence intensity generated when excitation light from LD light source etc. with high power density in the range of wavelength (about 400 nm to about 635 nm) is transmitted with a fiber with the high (for example, NA: 0.2 or more) numerical aperture NA can be controlled.

Further, structure where relative index difference of cladding layer and core is not less than about 2% (or not less than about 3%), and ratios (cladding layer/core) of a cladding layer diameter to a core diameter are about 1.01 to about 3.0 (or about 1.02 to about 3.0) is provided, thereby, a silica-based multi core optical fiber (the following, it is called as "silica-based multi core optical fiber A") in high-resolution and high S/N ratio can be obtained.

At this point, cladding layer is a part with a low refractive index placed around each core, and an outer diameter before becoming silica-based multi core optical fiber unified finally is a fiber wires outer diameter. These fiber wires heat silica core preform soot by whom germanium was doped with a sintering furnace, form a glass rod for cores, draw this core outer periphery in an optical fiber preform in which a glass layer to be common cladding layer is formed, and have a predetermined outer diameter. That is, a cladding layer diameter currently used at this point is not an outer diameter of the whole unified silica-based multi core optical fiber.

In this silica-based multi core optical fiber A, even if an fluorine concentration of germanium in the central part of the core 1 is more than 15 wt %, auto fluorescence with awavelength of 500 nm to 800 nm, which originates in Ge by excitation light (about 30 mW) with a wavelength of 405 nm to 635 nm and is occurred, can be controlled.

For this reason, fluorescence from an observation part is acquirable with a high S/N ratio in the case of observation by a fluorescent imaging method.

On the other hand, when a Ge concentration in the central part of the core 1 is less than 15 wt %, it becomes difficult to maintain NA needed from limitation of material not less than to 0.30. However, since a Ge concentration is more than abbreviation 15 wt % (not more than about 30 wt %) in the silica-based multi core optical fiber A, it is easy to ensure needed NA value by adjusting, while an fluorine concentration is about 0.05 wt % to about 3 wt % as F doped quantity.

In addition, needing not less than about 0.30 NA is for fully taking in fluorescence from an observation part. If it is going to achieve NA exceeding 0.45, since an addition of Ge to the core 1, and fluoride (F) to the cladding layer or an addition of boron (B) must be increased and steady fabricating will become difficult, NA is limited to not more than about 0.45.

$SiCl_4$ and $GeCl_4$ are produced as a starting material in the silica-based multi core optical fiber A, thereby about 0.1 wt % to 0.3 wt % can be included for the chlorine concentration. By including chlorine, a refractive index can be raised a little as above-mentioned.

According to examination by the inventors, when F was not included in the core 1, a tendency for auto fluorescence broad mentioned above to become strong is seen so that there is much quantity of chlorine included in the core 1. The inventors found out that broad auto fluorescence intensity in the range of wavelength (about 500 nm to about 800 nm) could be controlled, by including the fluorine concentration with not less than about 0.05 wt % in the core 1.

At this point, this example has the problems that a numerical aperture will become small with refractive index reduction by F if addition concentration of F to the core 1 exceeds 2 wt %, and that it is generated by many air bubbles at the time of making fiber, and realistic fabricating is not borne will occur.

Moreover, overall length of the measured silica-based multi core fiber is 2 m. This is from a reason about 2 m is needed from a point of workability, etc., when using the silica-based multi core fiber for the fluorescent imaging method. If overall length becomes long, since auto fluorescence which originates in above-mentioned Ge tends to become so remarkable that overall length of the silica-based multi core optical fiber is long since the substantial amount of germanium in the core 1 increases, it is important practically that the above-mentioned characteristics are obtained, in this length.

As explained above, since existence or nonexistence of an fluorine concentration in a core center unit, a Ge concentration, and chlorine are limited according to the silica-based multi core optical fiber according to the embodiment of the invention, auto fluorescence in the range of about 500 nm to about 800 nm wavelength resulting from Ge in the core can be controlled, therefore fluorescence from a biomedical tissue of an observing object can be observed by a high S/N ratio.

Moreover, according to the silica-based multi core optical fiber according to the embodiment of the invention, it becomes possible to produce the silica-based multi core optical fiber of a narrow diameter with cell level resolution by limiting a ratio of the core and cladding layer.

Moreover, also in use with the silica-based single core optical fiber of the silica-based multi core optical fiber according to the embodiment of the invention, an auto fluorescence phenomenon in the range of wavelength (about 500 nm to about 800 nm) occurred when light with a wavelength of about 405 nm to about 630 nm is incident can be controlled.

According to the silica-based multi core optical fiber and the fabrication method for the same according to the embodiment of the present invention, accuracy of fluorescent diagnostics can be improved by high-resolution and a high S/N ratio.

Moreover, according to the silica-based single core optical fiber and the fabrication method for the same according to the embodiment of the present invention, in fluorescence detection from tissue to be observe, luminescence detection, a spectral analysis, etc., an S/N ratio can be improved and detecting accuracy and analysis accuracy can be improved.

(Other Exemplary Embodiments)

The present invention has been described by the exemplary embodiments and their modifications, as a disclosure including associated description and drawings to be construed as illustrative, not restrictive. With the disclosure, artisan might easily think up alternative embodiments, embodiment examples, or application techniques.

It will be seen that the embodiments of the present invention, as well as the modifications, have come up with implied structural innovations for a semiconductor device with an enhanced breakdown capability, including application of a guard ring structure or field plate structure.

According to any one of the embodiments or modifications described, the method of fabricating a semiconductor device employs a sequence of ion implantation or diffusion processes, which may be substituted by applicable measures, such as a wafer bonding process in which wafers are bonded together.

Such being the case, the present invention covers a variety of embodiments, whether described or not.

INDUSTRIAL APPLICABILITY

An optical fiber of the invention is an optical fiber which controls an auto fluorescence phenomenon in a light region occurring when transmitting light of a light region (about 400 nm to about 800 nm). Therefore, it may be used for confocal fluorescent imaging, fluorescence detection, luminescence detection, a spectral analysis, etc., and can be applied to many industrial application fields, such as the medical field and the somatometry field.

What is claimed is:

1. A silica-based single core optical fiber for fluorescent imaging, comprising
   a core comprising a Ge concentration which is not less than 15 wt %, a fluorine concentration which is 0.05 wt % to 2 wt %, and a chlorine concentration which is 0.1 wt % to 0.3 wt %; and
   a cladding layer cladding the core,
   wherein excitation light having a wavelength of 400 to 650 nm, which is incident from a first edge, is transmitted and illuminated to an object by emitting from a second end, a light from the object including a fluorescence is incident to the second end and is transmitted and emitted from the first edge,
   a relative index difference of the cladding layer and the core is not less than 3%, and
   a ratio of an outer diameter of the cladding layer to a diameter of the core is 1.02 to 3.0.

2. The silica-based single core optical fiber according to claim 1, wherein a diameter of the core is 2 micrometers to 390 micrometers.

3. A silica-based multi core optical fiber for fluorescent imaging, comprising;
   two or more cores, each core comprising $GeO_2$—$SiO_2$ glass a germanium concentration which is not less than 15 wt % and a fluorine concentration which is 0.05 wt % to 2 wt %, and a chlorine concentration which is 0.1 wt % to 0.3 wt %; and
   a cladding layer cladding the cores,
   wherein excitation light having a wavelength of 400 nm to 650 nm, which is incident from a first edge, is transmitted and illuminated to an object by emitting from a second end, a light from the object including a fluorescence is incident to the second end and is transmitted and emitted from the first edge,
   a relative index difference of the cladding layer and each of the cores is not less than 3%, and
   a ratio of an outer diameter of the cladding layer to a diameter of each of the cores is 1.02 to 3.0.

4. The silica-based multi core optical fiber according to claim 3, wherein a diameter of each core is 1.0 micrometer to 10 micrometers and intervals, defined as a distance between a center of a first core to a center of an adjacent core, are 3.0 micrometers to 15 micrometers.

5. The silica-based multi core optical fiber according to claim 3, wherein a numerical aperture of the optical fiber is not less than 0.30 and not more than 0.45.

* * * * *